United States Patent
Terrell, II

(10) Patent No.: US 7,043,649 B2
(45) Date of Patent: May 9, 2006

(54) SYSTEM CLOCK POWER MANAGEMENT FOR CHIPS WITH MULTIPLE PROCESSING MODULES

(75) Inventor: James Richard Terrell, II, Charlotte, NC (US)

(73) Assignee: PortalPlayer, Inc., San Jose, CA (US)

( * ) Notice: Subject to any disclaimer, the term of this patent is extended or adjusted under 35 U.S.C. 154(b) by 570 days.

(21) Appl. No.: 10/300,348

(22) Filed: Nov. 20, 2002

(65) Prior Publication Data

US 2004/0098631 A1    May 20, 2004

(51) Int. Cl.
    *G06F 1/32*    (2006.01)
(52) U.S. Cl. .................................. 713/322
(58) Field of Classification Search .............. None
    See application file for complete search history.

(56) References Cited

U.S. PATENT DOCUMENTS

| | | | |
|---|---|---|---|
| 5,220,660 A * | 6/1993 | Yoshizawa et al. | 713/375 |
| 5,510,740 A * | 4/1996 | Farrell et al. | 327/142 |
| 5,530,845 A * | 6/1996 | Hiatt et al. | 703/27 |
| 5,758,133 A * | 5/1998 | Evoy | 713/501 |
| 5,862,368 A * | 1/1999 | Miller et al. | 713/375 |
| 6,397,340 B1 * | 5/2002 | Watts et al. | 713/322 |
| 6,728,959 B1 * | 4/2004 | Merkey | 718/102 |
| 6,754,837 B1 * | 6/2004 | Helms | 713/322 |
| 6,775,776 B1 * | 8/2004 | Vogt et al. | 713/186 |
| 6,804,267 B1 * | 10/2004 | Long et al. | 370/524 |
| 6,816,809 B1 * | 11/2004 | Circenis | 702/178 |
| 6,845,456 B1 * | 1/2005 | Menezes et al. | 713/320 |
| 2001/0044909 A1 * | 11/2001 | Oh et al. | 713/600 |
| 2005/0125705 A1 * | 6/2005 | Cheng et al. | 713/322 |

\* cited by examiner

*Primary Examiner*—Lynne H. Browne
*Assistant Examiner*—Anand B. Patel
(74) *Attorney, Agent, or Firm*—David H. Jaffer; Pillsbury Winthrop Shaw Pittman LLP

(57) ABSTRACT

A system and method are disclosed for controlling the frequency of a common clock which is shared by a plurality of processing elements. The usage of the common clock by each of the plurality of processing elements is measured, and the common clock is controlled to have a frequency determined as a function of the measured common clock usage by the plurality of processing elements.

20 Claims, 3 Drawing Sheets

SYSTEM CLOCK POWER MANAGEMENT FOR CHIPS WITH MULTIPLE PROCESSING MODULES

TECHNICAL FIELD

The present invention is directed generally to power management in electronic devices, and in particular to power management in multiprocessor systems.

BACKGROUND ART

Power management of chips that contain a single processing module by adjusting the system clock frequency is a well-known technique used by designers of portable, battery-operated computing equipment such as laptop computers, handheld computers, cell phones, etc. The system clock can be adjusted downward or upward to match the processing requirements of the applications that are currently running. Since there is only one processing module, the system clock frequency can be optimized solely for its requirements.

On a multi-processor system where the system clock is shared amongst multiple processing elements, the determination of the optimal system clock frequency is not so straightforward.

One approach is to simply run the system clock at its maximum frequency and gate off the clock source to individual processing elements when they are idle. This approach saves the power that would be consumed by an idle processing element. However, a significant portion of the power used by a particular chip design may actually be consumed by chip components other than the processor cores. Leaving the system clock running at a high frequency causes these overhead components to continue to drain power at a higher rate than is necessary.

So, it is desirable to be able to reduce the frequency of a shared clock to the minimum frequency that allows the processing elements to function correctly while using the least amount of power.

Examples of applications where such a control feature would be desirable include:

A chip that contains two or more CPU cores, all of which share a common system clock.

An on-chip bus that hosts two or more bus masters, all of which share a common bus clock.

SUMMARY OF THE INVENTION

An object of the present invention is to provide a method and apparatus for measuring processor clock usage amongst multiple processing elements that share a common clock, and allowing for the determination of the minimum frequency that the shared clock can be run at in order to meet processing requirements for all of the processor elements.

Another object of the present invention is to provide a hardware based method and apparatus for measuring processor clock usage of a shared clock by processors in a multiprocessor system and for setting a minimum shared clock frequency which permits the processors to operate effectively while also reducing power consumed by the processors.

A further object of the present invention is to provide a software based method and apparatus for determining processor clock usage by processors operating off of a system clock and for controlling the system clock to operate at a minimum clock frequency which accommodates the operational requirements of the processors while reducing power consumed by them.

A still further object of the present invention is to provide a method and apparatus for controlling a clock shared by multiple processors based upon clock usage by each processor and so that the busiest processor determines the minimum clock frequency.

It is still another object of the present invention is to provide a method and apparatus for controlling a clock shared by multiple processors based upon clock usage by each processor and so that the busiest processor determines the minimum clock frequency and further including a guard band frequency to alter the determined minimum clock frequency to accommodate processor usage spikes.

Another object of the present invention is to provide a method and apparatus for controlling a common clock for multiple processing elements based upon measured usage of the common clock by the processing elements and controlling the common clock based upon the measured usage, and which includes increasing the frequency of the common clock when it is determined that system performance may suffer because the busiest processor is not idle enough over a sample period.

In accordance with the present invention, a system is provided that controls the frequency of a common clock shared by a plurality of processing elements, comprising a plurality of counter elements each associated with one of the plurality of processing elements and coupled to count the common clock whenever the associated processing element is in an idle state; and a controller coupled to receive counts from the plurality of counter elements and which controls the common clock to have a frequency determined as a function of the counts from the plurality of counter elements. The counter elements and the controller may be implemented in hardware or software or a mix thereof.

In a system in which a plurality of processing elements share a common clock, the method of the present invention comprises the steps of measuring usage of the common clock by each of the plurality of processing elements; and controlling the common clock to have a frequency determined as a function of the measured common clock usage by the plurality of processing elements.

The above and other objectives and advantages of the present invention will be better understood upon consideration of the following detailed description and accompanying drawings.

DETAILED DESCRIPTION OF THE INVENTION

Figure 1:
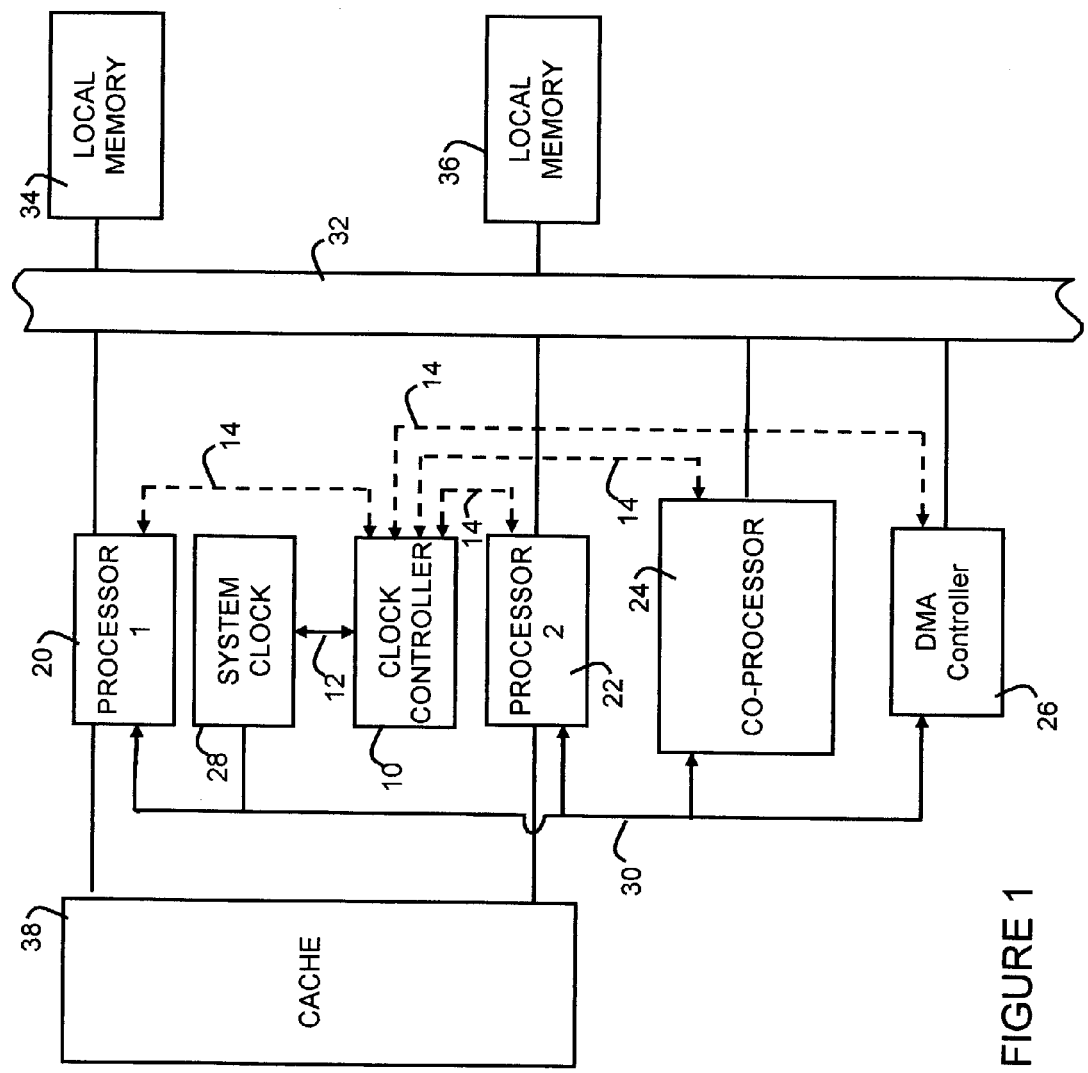
FIG. 1 is a simplified block diagram of a multi-processor system in which a system clock is controlled in accordance with the present invention.

A detailed description of several example embodiments of the present invention will now be provided. FIG. 1 is a simplified functional diagram illustrating a multiprocessor system in which clock usage by several processors is measured and controlled in accordance with the present invention.

In FIG. 1, several processors 20, 22, 24 and 26, are shown sharing a system clock 28. In this example, processors 20 and 22 are processor cores; processor 24 is a co-processor; and processor 26 is a DMA controller. These processors are tied to a system bus 32, to which is also connected local memory 34 and 36. Processor cores 20 and 22 also communicate with a cache memory block 38.

A common system clock signal is supplied to processors 20, 22, 24 and 26 on line 30 from system clock 28.

Also shown in FIG. 1 is a system clock control 10 that communicates with system clock 28 via path 12, and with each of the processors 20, 22, 24, and 26 via paths 14.

There are two basic steps employed in the present invention:
1. Over a sample period, measure how many clock cycles are being used by each processing element that is attached to the shared clock.
2. Adjust the system clock frequency to provide the minimum number of clock cycles required by the processing element that is using the largest number of clock cycles.

This approach assumes a steady usage of clock cycles by each processing element over the sample period. While it is recognized that it would be desirable to have mechanisms to handle spikes in cycle usage, the present invention is primarily focused on operational modes involving steady usage of clock cycles.

Measuring Clock Usage

Two approaches that can be used for measuring clock usage will now be described. The first approach employs hardware to assist in the measurement, while the second uses software interaction and control.

Hardware Measurement

Figure 2:
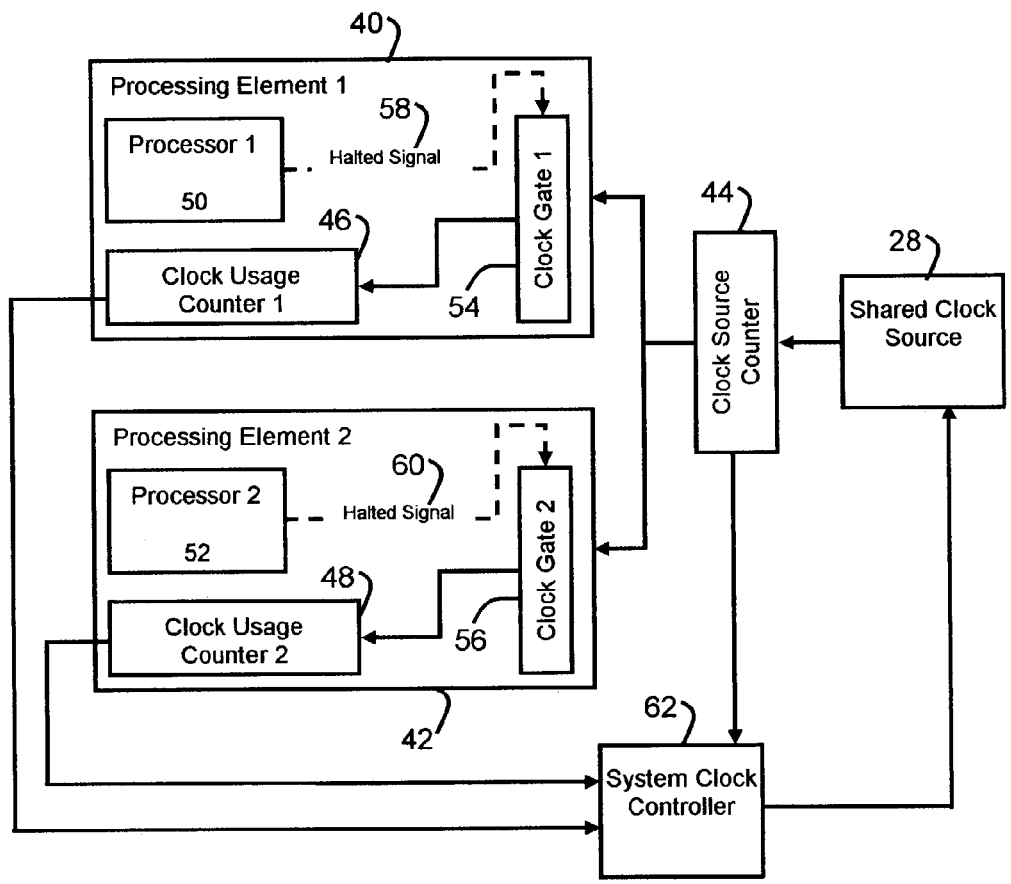
FIG. 2 is a simplified block diagram illustrating hardware for measuring and controlling a system clock which is shared by multiple processors in accordance with the present invention.

In the diagram of FIG. 2, an example is provided in which a shared clock source 28 is routed to two processing elements, 40 and 42. From the following, one skilled in the art will appreciate that this two-processor example can readily be applied to systems having an even greater number of processing elements. A "Clock Source Counter" register 44 is provided that counts all clock cycles from shared clock source 28. Each processing element, 40 and 42, contains a Clock Usage Counter 46 and 48, respectively, that counts the clock cycles used by the associated processing module, 50 and 52, respectively, to do actual work. The flow of clock cycles to be counted by these counters are gated through Clock Gates 54 and 56, respectively, which are enabled and disabled by a Halted Signal, 58 and 60, respectively, produced by the Processing Element's Processor module, 50 and 52, respectively.

As will be recognized by those skilled in the art, various commercially available processors have a halt, idle, or similar instruction which shuts off the clock to the core and causes the processor to go into a low power mode. The x86 processor family, manufactured by Intel Corporation of Santa Clara, California, has such a feature. The "halted signal" can be derived from the states of the processor output pins associated with the processor's "halted" condition. As for other processor cores that do not have a built-in halt instruction, those skilled in the art will understand that additional logic can be provided as a part of the chip set for the processor core through which the shared clock to the processor core can be gated on or off as a function of whether the processor is in an idle state, or is being requested to do actual work. For example, a register can be provided as part of the chip set, which stores a bit that controls logic to turn off the shared clock to the processor core. The bit can be controlled by the programming being executed by the processor core.

Turning to Processor element 40, as an example, when Processor Module 50 is running, the Clock Usage Counter 46 increments once for each clock cycle used by the Processor Module 50. When a Processor Module 50 is halted, the shared clock to Clock Usage Counter 46 is gated off by the Halted Signal 54 and Clock Gate 54, and the Clock Usage Counter 46 does not increment.

The counts of Clock Source Counter 44 and Clock Usage Counters 46 and 48 can be compared periodically to measure the number of clock cycles that are used by each Processing Element to perform work, as well as the number of clock cycles that are not used while a Processing element's Processor module is halted. In FIG. 2, the accumulated counts of Clock Usage Counter 46 and 48, and of Clock Source Counter 44, are shown being supplied to System Clock Controller 62 for processing. In turn, the output of System Clock Controller 62 is shown being applied to the Shared Clock Source 28 to control the frequency of the Shared Clock Source 28 clock.

Software Measurement

A software implementation also can be used for measuring clock cycle consumption by the processor elements. The implementation employs the following:
1. A method to turn off the clock to the individual processing elements whenever they are idle.
2. A method to turn on the clock to the individual processing elements whenever they become busy.
3. A free-running timer that is tied to the shared clock.

Figure 3:
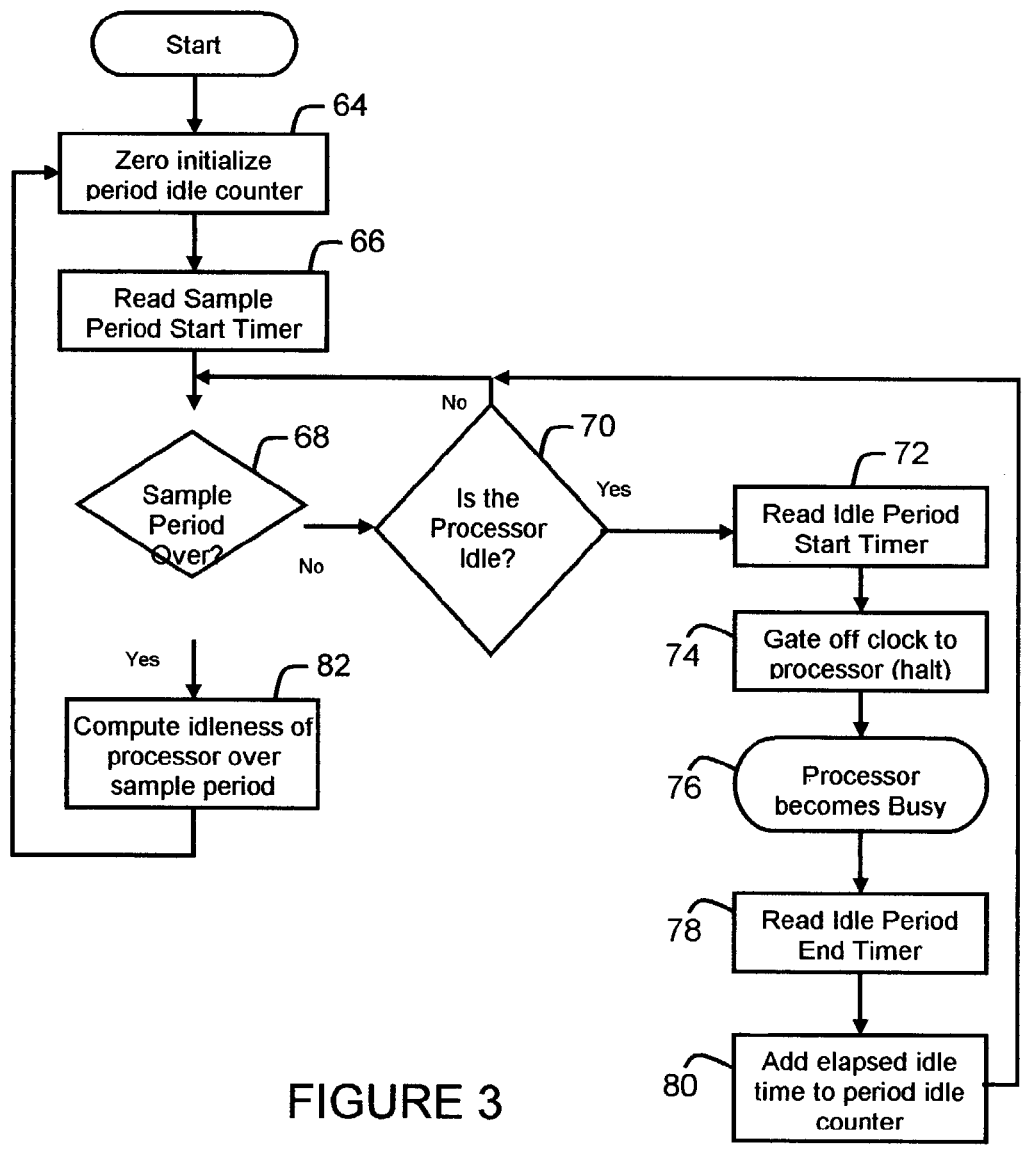
FIG. 3 is a simplified flow diagram illustrating a software implementation of present invention for measuring and controlling a system clock which is shared by multiple processors.

Measurement of clock cycles used versus clock cycles wasted can be done using the sequence (for each processor) of FIG. 3, for example. The sequence uses readings from the free running timer, a count maintained in a Period Idle Counter, and a designated Sample Period. The process set forth in FIG. 3 can be embodied in a computer program that is run in each of the processors, and with the measured result being passed to a controller functional block such as clock controller 10 of FIG. 1, for adjustment of the system clock.

To begin, the Period Idle Counter associated with the processor is zeroed out in step 64. In step 66, the free running timer is read and the reading is referred to as the Sample Period Start Timer. A check is made in step 68 to determine whether the Sample Period is over based upon a comparison of the current reading of the free running timer and the Sample Period Start Timer reading. If the Sample Period is not over, the processor is checked in step 70 to determine if it is or is about to enter an idle state. If it is determined that the processor is not idle, the system loops through steps 68 and 70 until either the sample period is over, or the processor enters an idle state.

If in step 70 the processor is on or is about to enter an idle state, an Idle Period Start Timer value is read from the free running timer in step 72. Once the processor enters an idle condition, the clock to the processor is gated off, see step 74. Step 76 is triggered when the processor becomes busy again. At that point, in step 78, the free running timer is again read to obtain an Idle Period End Timer reading which when compared to the Idle Period Start Timer value indicates an elapsed time over which the processor was idle. This elapsed time is determined and is added to the Period Idle Counter in step 80.

Over each sample period, the time spent with the clock to the processor disabled (idle time) is measured in each processing element and accumulated. At the end of the sample period, the time spent idle versus the time spent busy can be measured and converted to clock cycles, as in step 82. This information is then passed along to the clock controller 10, FIG. 1, for use in adjusting the system clock 28.

CPU Interrupt Masking

In the sequence of FIG. 3 above, if the processing element is a CPU and the idle measurement is being done with software being executed by the processor, steps should be taken in handling interrupts to the processor. In particular, because the processor idle time reading should exclude the time taken by the processor in handling the interrupt, interrupts should be "masked" while the processor is idle so that the timer reading taken after the processor becomes busy will not include time spent handling the interrupt that may have caused the processor to become busy. In other words, the processor should be configured so that when in an idle or halted condition, the receipt of a hardware interrupt will cause the processor to come out of its idle or halted condition and to first take a reading of the free running timer, step 78, to obtain the Idle Period End Timer reading. Thereafter, the interrupt would be unmasked, and the processor would then process the interrupt.

Adjusting Clock Frequency

After the clock cycle usage for each processing element is known over a given sample period, the clock frequency can be adjusted to match minimum processing requirements. In the preferred embodiment of the present invention, the following criteria are used:

1. The busiest processor determines the minimum clock frequency.
2. If the busiest processor is idle half of the time, for example, then the system clock frequency can be lowered. If the relationship between system clock frequency and processing performance is linear, and the busiest processor is idle half the time, the system clock frequency may be lowered by up to one half.
3. A "guard band" frequency can be calculated and added to the minimum clock frequency computed above to protect the system from expected processor usage spikes.
4. If the busiest processor is not idle enough over a sample period, the clock frequency is increased to keep system performance from suffering.

For example, assume a system clock frequency of 100 MHz, that the busiest processor is idle such that 50 M clock cycles out of 100 M total clock cycles are unused over a one second sample period, and that there is a linear relationship between processor performance and clock frequency. Under these conditions, the unused clock cycles are computed to be 50 MHz and the clock frequency might be lowered to around 54 MHz, assuming a guard band frequency of 4 MHz, for example. On the other hand, if the busiest processor were idle only twenty five (25) percent of the time (i.e., 25 M out of 100 M clock cycles were unused over a one second sampling period), the system clock frequency might be decreased to 79 MHz, again, assuming a 4 MHz guard band. For the above case, a sample period of 250 milliseconds could be used, and an "idleness" in the range of 4 MHz and greater could be chosen as indicating conditions which suggest that a lowering of the system clock frequency is merited. If the idleness of the busiest processing element, in MHz, falls below the guard band limit, then the system clock frequency is increased by some amount. For example, if the system clock is at 70 MHz, and the busiest processor only has 2 MHz idle during a sample period, then the system clock frequency might be increased to its maximum (say, 100 MHz) to guard against system performance starvation (not having enough clock cycles to process the current system workload).

It is to be appreciated that the method and apparatus of the present invention is capable of varying the system clock frequency both upwardly and downwardly, as a function of the measured "idleness" of the processors in the system. Thus, although during a particular processing period the present invention may cause the system clock frequency to be lowered, at a later time any increased processor activity can be recognized by the present invention and the system clock frequency raised accordingly.

While the embodiments described in detail above measure the time a processor is idle over a specified period, it will be readily appreciated by those skilled in the art that a measurement can be made of the time the processors are busy during a specified period and that adjustment of the system or common clock frequency can be made based upon such measurements, to achieve the desired power savings or other result.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. In a system in which a plurality of processing elements share a common clock, a method comprising the steps of
  a. measuring clock cycle usage of the common clock by each of the plurality of processing elements; and
  b. controlling the common clock to have a frequency determined as a function of the measured common clock cycle usage by the plurality of processing elements.

2. The method of claim 1 in which the measuring step is implemented in hardware.

3. The method of claim 1 in which the measuring step is implemented in software.

4. The method of claim 1, wherein the measuring step comprises the step of using a software timer to measure the time that a processor core of at least one of the plurality of processing elements is halted or not halted.

5. The method of claim 1, wherein the measuring step includes the step of using a hardware counter to count busy versus idle clock cycles consumed by at least one of the plurality of processing elements.

6. The method of claim 4 further including the step of masking interrupts while the processor core of the plurality of processing elements is halted so that a measured time for when the processor core is halted excludes interrupt processing by the processor core.

7. The method of claim 4, wherein the software timer is a free-running timer having a frequency related to a frequency of the common clock.

8. The method of claim 1, wherein the controlling step includes the steps of identifying a busiest processing element from the at least two processing elements for which clock cycles were measured; and
  adjusting the frequency of the common clock as a function of the common clock cycle usage by the busiest processing element.

9. The method of claim 8, wherein the adjusting step includes the step of increasing the frequency of the common clock when the common clock cycle usage by the busiest processor is above a selected threshold.

10. The method of claim 8, wherein the adjusting step includes the step of decreasing the frequency of the common clock when the common clock cycle usage is within a designated range of usage.

11. The method of claim 8, wherein the adjusting step includes the step of including a guard band frequency range when adjusting the frequency of the common clock as a function of the common clock cycle usage by the busiest processing element.

12. In a system in which a plurality of processing elements share a common clock, a method comprising the steps of
 a. measuring clock cycle usage of the common clock by each of the plurality of processing elements; and
 b. controlling the common clock to have a frequency determined as a function of the measured common clock cycle usage by the plurality of processing elements,
 wherein the usage measuring step includes the steps
 measuring clock cycles from the common clock over a selected period;
 for at least two processing elements of the plurality of processing elements, measuring clock cycles from the common clock over the selected period while the at least two processing elements were halted; and
 for each of the at least two processing elements, determining a proportion of the selected period during which the at least two processing elements were halted.

13. In a system in which a plurality of processing elements share a common clock, a method comprising the steps of
 a. measuring clock cycle usage of the common clock by each of the plurality of processing elements; and
 b. controlling the common clock to have a frequency determined as a function of the measured common clock cycle usage by the plurality of processing elements,
 wherein the measuring step includes the step of excluding from measured usage the time a processor of the plurality of processors takes to respond to an interrupt which is received while the processor is halted.

14. A system that controls the frequency of a common clock shared by a plurality of processing elements, comprising
 a. a plurality of counter elements each associated with one of the plurality of processing elements and coupled to count clock cycles of the common clock whenever the associated processing element is in an idle state; and
 b. a controller coupled to receive counts from the plurality of counter elements and which controls the common clock to have a frequency determined as a function of the counts from the plurality of counter elements.

15. The system of claim 14, wherein the controller controls the frequency of the common clock as a function of the count from the counter element associated with the busiest processing element.

16. The system of claim 14, wherein the controller controls the frequency of the common clock to include a guard band of frequencies.

17. The system of claim 14, wherein the controller increases the frequency of the common clock when the count from the counter element associated with the busiest processing element indicates a level of activity above a designated threshold of activity.

18. The system of claim 14, wherein the controller decreases the frequency of the common clock when the count from the counter element associated with the busiest processing element falls within a designated range.

19. The system of claim 14, wherein the plurality of counter elements and the controller are implemented under software control.

20. The system of claim 14, wherein the plurality of counter elements and the controller are implemented in hardware.

* * * * *